July 28, 1931. L. H. CHURCH 1,816,669
CABLE CONNECTER
Filed March 31, 1927

Inventor
LEWIS H. CHURCH
By Bohleter & Ledbetter
Attorneys

Patented July 28, 1931

1,816,669

UNITED STATES PATENT OFFICE

LEWIS H. CHURCH, OF ROSELLE, NEW JERSEY, ASSIGNOR TO THE THOMAS & BETTS CO., OF ELIZABETH, NEW JERSEY, A CORPORATION OF NEW JERSEY

CABLE CONNECTER

Application filed March 31, 1927. Serial No. 179,750.

This invention relates to cable connecters to fasten cable to electric fixture and outlet boxes.

An object is to produce a cable connecter wherein a feature of the invention resides in a single clamp which performs two main functions, that of securing the cable to the box and anchoring the connecter in the box, there being provided a single operating means such as a screw which is threaded into and carried by the clamp to cause the single clamp to perform its two functions; and I may refer to the clamp as a combination cable and box clamp and which is so constructed and arranged as to protect the cable from direct contact with the screw.

A further object of the invention is to produce a cable connecter which exposes the box hole edge directly to a cable therein placed, i. e. to produce an improved "exposed box hole edge type" cable connecter wherein the cable is gripped between the exposed box hole edge and connecter, novelty being in a single clamp element of U-shaped design to perform the two functions by a single operating means such as a screw, and novelty also residing in the fact that the screw is carried freely within a connecter member but threaded through the clamp plate, the U-shaped clamp being mounted on the connecter frame member from the outer end thereof, and the operating means, the screw, being disposed within the box.

It is also an object to produce a cable connecter, the frame or sleeve member of which does not necessarily require a screw threaded hole in which to place the screw but the member is so designed that it may be made to include the necessary opening or provision for mounting the screw in position, the screw acting to hold the connecter member and clamp in assembled relation, and this connecter member is novel in these and other respects.

The above and other objects will be more apparent from the following description taken in connection with the accompanying drawings illustrating examples of the invention wherein:

The first three figures show the connecter member of the cable connecter before assembling therewith the operating means such as a screw and the novel clamp, it being understood that the connecter member need not necessarily be made in sleeve form although shown as such in this example of the invention.

Figure 1 shows the connecter member in elevation looking from above or below. Figure 2 is a longitudinal sectional view taken on the plane 2—2 of Figure 1. Figure 3 is an outer end view of the connecter member looking from the right in Figure 2.

The next two figures show the formation of the U-shaped combination cable and box clamp which is capable of performing two purposes to-wit, that of gripping or clamping against the cable, and that of anchoring against the box hole edge.

Figure 1:
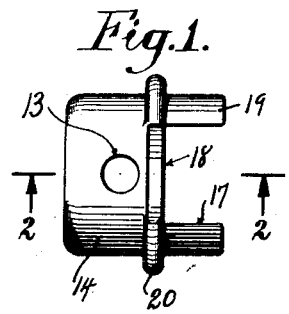
Figure 2:
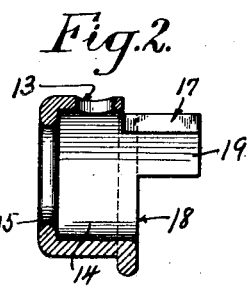
Figure 3:
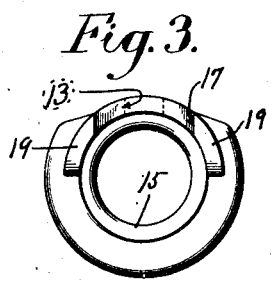

Electric fixture and outlet boxes B are made with knockout openings or holes H to receive the connecter and cable C. By use of the improved connecter the cable C is anchored in the box B and electric wiring connections are made in the usual way inside the box with the wires W extending through the box hole.

In general, the cable connecter comprises a frame member on which is carried a combination cable and box two arm clamp having a novel mode of operation and in this instance being U-shaped in form, both arms of which serve in a gripping capacity, a screw or other operating means performing the double purpose of holding together the connecter member and the clamp and expanding both arms of the clamp to make it grip against two parts, namely the cable and the box. The operating means is carried with the cable and box clamp and reacts to move both ends of said clamp, one end against the box hole edge and the other end against the cable.

To further describe the invention, reference is made to the drawing wherein the connecter member is shown as an example in the form of a sleeve 14 preferably formed with a bushing 15 at one end against which the ragged extremity of the cable C rests and out through which extend the wires W into the box B. The bushing 15 of the connecter member is a complete circular bushing uncut or uninterrupted and therefore it fully protects the wires W from abrasion as the wires are bent and pulled into the box in making electrical connections. The sleeve is slotted as at 17, this slot extending from the outer end of the connecter member 14 back towards the bushing end 15 for the purpose of receiving one or both arms of the clamp and to uncover the box edge for engagement with a box clamp arm to be described. A loose screw hole 13 is made in the connecter member 14 adjacent the slot 17 through which a screw freely passes as will be described.

The connecter member 14 is also partly cut away at its outer end to form a transverse abutment face 18 adapted to rest against the inside box wall. The transverse cut away line 18 extends partly through the sleeve leaving a sleeve projection 19 in which the aforesaid slot 17 is formed. The sleeve extension 19 therefore extends beyond and overhangs the abutment end or edge 18 of the connecter member and affords length to the slot 17 to movably receive the free ends of the clamp arms. The form and construction of the connecter member 14 is such that, when mounted in the box hole H, a portion of said box hole edge is left exposed directly to a cable C with the connecter extension 19 projecting through the box hole and overhanging the exposed box hole edge portion.

The connecter member may also include a rib 20, the abutment face of which is in the same plane as the abutment edge 18, this rib reaching over the connecter extension 19 to abut against the box wall and fix the connecter against movement in one direction. In fact the rib 20 makes the sleeve 14 too large to pass through the box hole so that only the sleeve extension 19 projects therethrough. The connecter member 14 is therefore of suitable size to fit in the box hole, and includes cut-away means to expose a portion of the hole edge directly against a cable. Thus the member 14 is so formed as to extend into the box hole and be stopped by the abutment 18—20 to fix it against movement in one direction and uncover the box hole edge.

It is now seen that the connecter member 14 has opposite cut-away portions thereby forming a slot or opening 17 at one place and an abutment edge 18 at another place in the sleeve. The result is that the box hole edge H is uncovered in two places so that the cable C may rest directly against one exposed part and the other exposed part is designed to afford an anchorage for a box clamp arm to be described.

Figure 4:
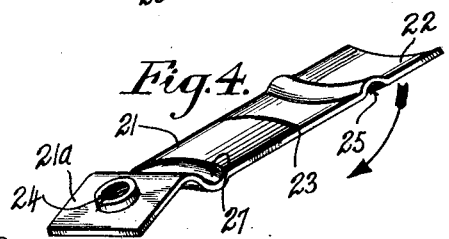
Figure 4 shows the stamping from which the cable and box clamp is made.
Figure 5:
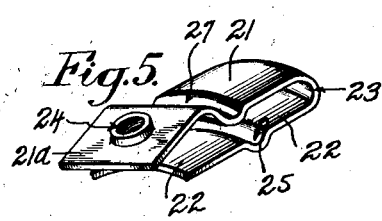
Figure 5 is a view in perspective showing the completed U-shaped clamp plate which in reality includes two clamp arms normally disposed in substantially parallel relation adapted to spread apart and exert a powerful gripping force against both the cable and box hole.
Figure 6:
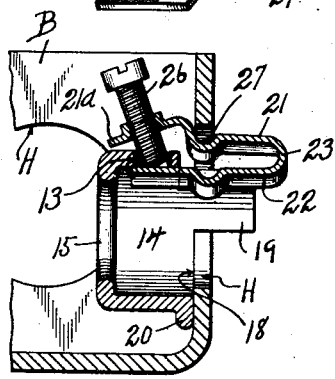
Figure 6 shows a longitudinal sectional box assembly on the line 6—6 of Figure 7 with the connecter resting loosely within a box hole before a cable is inserted and before the operating means is tightened up.
Figure 7:
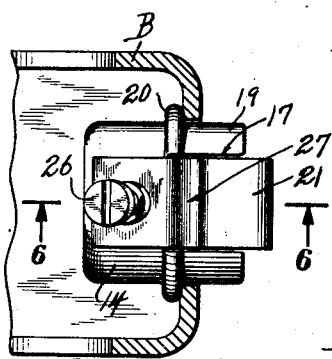
Figure 7 is a longitudinal sectional box assembly view looking down on Figure 6 with the connecter in elevation.

The cable and box clamp and single operating means will now be described and reference is made to Figures 4 and 5 which merely show an example of the U-shaped combination cable and box clamp plate which is subject to various changes in form and use. Characteristically, one arm of the clamp anchors against the box edge the other arm grips against the cable.

The cable and box clamp comprises a stamping bent upon itself at 23 and having flexible ends or clamp plate arms 21 and 22 connected by the bend 23 which may lie within the slot 17. The box and cable clamp 21—22 is of general U-shaped design and is provided with a tapped screw hole 24 made in the extremity 21ª which is adapted to be disposed within the box B beyond the anchorage groove 27, the screw hole 24 receiving the operating means such as a cable clamp screw 26. The box clamp arm 21 is provided with suitable box hole anchorage means in the form of a groove 27 located between the screw 26 and clamp bend 23 and adapted to engage the box hole edge H proximate the connecter extension 19 within the slot 17 while the cable clamp plate 22 is designed to press or grip against the cable C. The clamp arms flex at the arch or bend 23 and thus close or separate toward or from each other.

Each clamp arm may be grooved if desired, the grove 27 constituting anchorage means to fasten upon the box hole edge and a groove 25 in the cable clamp plate 22 being provided to register with the spiral grooves in the cable C. The two grooves or anchorage means 27 and 25 are stamped or pressed into the plate proximate each other and preferably positioned so that both fall within the plane of the box wall.

A description of the connecter member 14 and the novel clamp plate 21—22 has been given and it is seen that they are assembled by inserting the U-shaped clamp on the connecter member by passing the shank of the screw 26 freely through the large size hole 13 of the connecter member 14. The screw 26 is run down against the cable clamp plate 22 and thus the screw holds the connecter member 14 and the flexible clamp 21—22 together without resorting to the formation of a special screw threaded hole made through the connecter member for the reception of the screw. The arched or bent end 23 of the connecter member lies freely in the slot 17 while the screw shank rests loosely in the hole 13 and thereby holds the parts together.

The clamp arms 21 and 22 are in effect loosely confined within the slot 17 which permits the outer free ends of the clamp arms to closely approach each other in order that the connecter may be readily inserted into small size box knock-outs. The slot 17 is therefore useful as an opening for the reception of the clamp arms, particularly the grooved end 27 of the upper clamp arm which may flex down into the slot 17 when the connecter is inserted within a small size box hole. The screw 26 is free of the connecter member 14 since it is screw threaded through and carried with the clamp, the screw shank being threaded into one arm and bearing on the other arm to effect a separating reaction. The free and large size screw hole 13 permits the clamp 21—22 to play freely in the connecter slot 17 as the connecter is being inserted in the box hole.

The box assembly views show how the connecter is mounted within the box. Preferably the connecter is placed in the box hole from the inside thereof, before the screw 26 is screwed down through the box clamp arm 21. In other words, the two clamp arms 21 and 22 lie proximate and parallel to each other when the connecter is inserted in the box hole. Furthermore, the two clamp arms extend past the stop means rib 20 so that both free ends of the arms 21 and 22 reach to or preferably extend past the box wall and through the box hole. A cable C is now inserted and the screw 26 is run down against the cable clamp plate 22, the result of which is to spread apart the clamp arms 21 and 22. This action of the screw firmly anchors the groove 27 of the box clamp arm 21 against the box hole edge H and forces the cable clamp plate 22 down against the cable C thereby gripping the cable between the exposed box hole and the flexible cable clamp plate 22.

The reaction of the screw 26 spreads apart the U-shaped clamp 21—22 and the downward pressure of the plate 22 against the cable C together with the upward pressure of the box clamp arm groove 27 against the box hole edge very firmly anchors the connecter member 14 in place within the box hole and against the inner wall of the box due to the opposition of forces exerted by the two clamp arms against the box and cable. In this way the sleeve 14 caps over and bushes the sharp ragged end of the cable C inside the box.

Figures 10, 11:
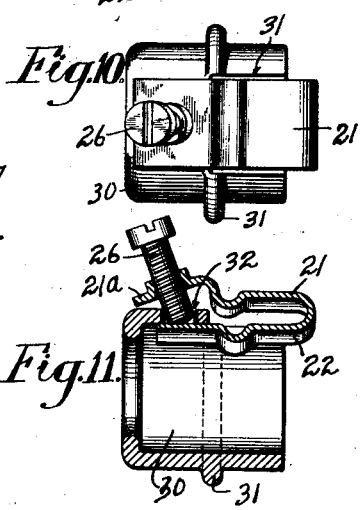
Figures 10 and 11 are, respectively, a top view and a side longitudinal sectional view of a modified form of cable connecter wherein the connecter member is of full sleeve form, as distinguished from the exposed box hole edge type, so that the cable rests entirely within the sleeve connecter and is therefore not gripped against the exposed box hole edge.
Figure 8:
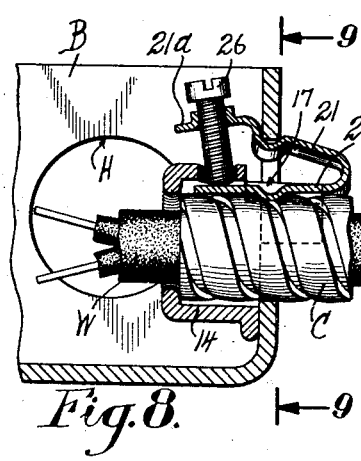
Figure 8 is a box assembly view similar to Figure 6 but showing a cable secured in the box hole by the connecter with the operating screw tightened up to anchor all parts together.
Figure 9:
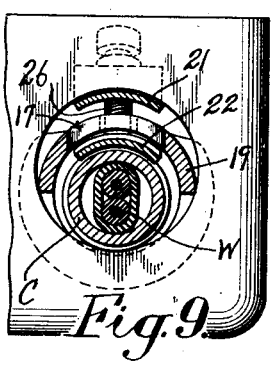
Figure 9 is a sectional view on the line 9—9 of Figure 8, being an outside box end view.

Figures 10 and 11 show a modified form of the invention wherein the sleeve 30 does not expose the box hole edge to the cable when the connecter is inserted in the box hole, but in this instance the sleeve 30 receives the cable directly thereinto and the cable is fastened within and against the sleeve wall. The sleeve 30 is slotted at 31 for the reception of the cable and box clamp and the sleeve is perforated at 32 for the free reception of the screw. A rib 31 encircles the sleeve as a box wall abutment to stop the connecter member against the box. As far as the two-purpose clamp is concerned in Figures 10 and 11, it may be constructed and used in about the same manner as in the main form of the invention as above described and comprises the box hole anchorage groove 27 on the box clamp arm 21 together with the cable clamp plate 22. The two clamp arm portions are forcibly separated by reaction of the screw 26 when it is screwed through the box anchorage clamp arm 21 and advances against the cable clamp plate 22.

Figure 12:
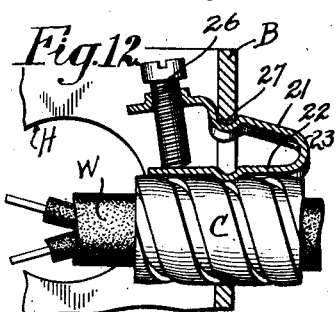
Figure 12 shows a sectional box assembly view of the combination cable and box clamp used as the connecter, without utilizing the connecter member.

In Figure 12 there is shown another modified form of the invention wherein the novel combination box and cable clamp and operating means are used alone without the connecter member or frame 14 to carry these parts, this view serving to further illustrate the principle of the invention. The screw 26 delivers pressure to the cable clamp plate 22 and the screw re-acts thereby lifting upwardly on box anchorage arm 21 bending it at the end 23 to lift the anchorage groove 27 against the box hole edge H. In other words, the clamp 21—22 moves apart with great force, the cable clamp plate 22 gripping against the cable and the box anchorage arm 21 fastening itself upon the box hole edge. In this way a single U-shaped clamp performs the double purpose of anchoring itself against the box hole edge and gripping against the cable and both functions are carried out by the lone operating screw 26 without threading it through the connecter frame member 14. In this improvement the screw 26 is disposed inside the box and the flexible bend 23 disposed outside the box within the slot 17.

I have therefore produced a new and improved connecter by mounting a U-shaped clamp astride a connecter member and making both of the free ends or arms thereof sufficiently long to reach through the box hole from the outside of the box to the inside thereof, a screw being threaded through one arm and designed to react against the other arm which results in spreading open the clamp to make each arm thereof simultaneously perform its function. The screw being inside the box well adapts the connecter to both old and new house wiring work.

The sleeve is so constructed and formed that the opening 17 exposes the box hole edge to the box anchorage groove 27 and arm 21 while the opposite exposed portion of the box hole edge is exposed to the cable. Thus the box edge is utilized to anchor the cable and the connecter thereto which removes the strain of the cable from the connecter member 14 and throws all the strain into the box wall.

What I claim is:

1. A connecter comprising; a combination cable and box clamp including, a box clamp arm with box hole edge anchorage means formed proximate the end of the arm and with its free end adapted to project through a box hole and be disposed within a box, and a cable clamp plate carried with the box clamp arm; a connecter member, a passageway through said member and operating means extending freely through the passageway and carried on the free end of the clamp way inside a box to simultaneously move both ends of said clamp to force the anchorage means against a box edge and bear the clamp plate against a cable.

2. A connecter comprising, a sleeve provided with a hole for free reception of operating means proximate the inner end thereof, a U-shaped cable and box clamp placed astride the sleeve wall with the free ends of the clamp pointed toward the inner end of the sleeve, and operating means working freely through the hole and carried with the clamp to effect separating movement of both free ends thereof to force one end against a cable and the other against a box hole edge.

3. A connecter comprising, a member provided with a slot and a hole adjacent the slot, a combination cable and box clamp comprising a plate bent upon itself to form a U-shaped two arm clamp mounted on the member from the outer end thereof within the slot, a screw threaded into one arm passing freely through the hole in the member and engaging the other arm to separate both arms of the clamp, and box hole edge anchorage means formed on one arm between the screw and the bend of the plate.

4. A connecter comprising, a sleeve including a bushing at the inner end, and being cut-away at its outer end to expose a box hole edge to a cable, and being provided with a hole proximate the inner end, a two arm U-shaped cable and box clamp mounted on the sleeve from the outer sleeve end, a screw which is threaded through one arm and is passed freely through the hole to engage the other arm, and box hole anchorage means formed on the arm through which the screw is threaded.

5. A connecter comprising, a sleeve connecter member cut-away at one end in two opposite places to expose a box hole edge at two opposite points, a U-shaped cable and box clamp including two parallel arms made from a plate bent upon itself, the clamp being mounted on the sleeve with the plate bend disposed at the outer sleeve end and within one of the cut-away places, said sleeve being provided with a hole proximate the inner sleeve end, a screw threaded through one arm and passing freely through the hole and engaging the other arm, and anchorage means on the clamp to fasten against a box hole edge.

6. A connecter comprising a connecter member, a hole through the member, a two-arm U-shaped cable and box clamp carried with the member, operating means carried with the connecter and passing freely through the hole in the connecter member to hold the parts together and spread the two arms apart, box hole anchorage means in one arm and a raised portion in the other for engaging grooves in the cable.

In testimony whereof I affix my signature.

LEWIS H. CHURCH.